Patented Feb. 23, 1937

2,071,862

UNITED STATES PATENT OFFICE 2,071,862

METHOD OF PRODUCING A METAL NAPHTHENATE

Gerald M. Fisher, Los Angeles, Calif., assignor to Socony-Vacuum Oil Company, Incorporated, New York, N. Y., a corporation of New York No Drawing. Application January 20, 1936, Serial No. 59,900

6 Claims. (Cl. 260—11)

The object of this invention is to produce metal naphthenates by direct combination of the metal oxide with naphthenic acid.

It is well known that various "naphthenic" or polymethylene carboxylic acids, having the general formula $C_nH_{2n-1}.COOH$ are found in many crude petroleums, that these bodies are fairly stable at normal pressure distillation temperatures and that they may be recovered as the alkali metal salts by treating either the crude or its distillation fractions with aqueous alkalis. The crude acids obtained by decomposition of the solutions of alkali metal salts thus obtained are, apparently, fairly complicated mixtures of individual acids, difficult to isolate, but having properties in common which render them useful as mixtures.

It is also well known that these mixed acids may be brought into combination with many metals to form metallic naphthenates, which must be assumed to be mixtures of individual naphthenates of the particular metal with which they are combined.

In the prior art, so far as it is known to me, the naphthenates of the alkali metals have been produced by direct reaction between the acids and an aqueous solution of the hydroxid of the metal, but the naphthenates of the heavy metals have invariably been produced by double decomposition of an alkali metal naphthenate with a water soluble salt of the metal, for example, by precipitating aluminum naphthenate from a solution of sodium naphthenate by the addition of aluminum sulfate.

The metallic naphthenates obtained in this manner are highly intractible by reason of their gummy or pasty consistency and it has been found very difficult to free them from the by-product alkali metal salt and from the large quantities of water which they entrain. A reasonable degree of freedom from contamination has been obtained only by tedious and expensive kneading or rolling in the presence of sufficient water to wash out the bulk of the by-product salt followed by very slow and careful drying to avoid excessive oxidation and consequent depreciation of the color of the naphthenate.

I have discovered that naphthenates of many of the heavy metals may be prepared by direct solution of their oxids or hydroxids in the acids themselves, thus avoiding the production of any by-product other than water, and that this reaction may be conducted under such conditions as to drive off the water of reaction (a very small proportion as compared to the water entrained from a wet precipitation) without damage to the properties of the naphthenate. I am thus enabled to obtain naphthenates of many metals in the anhydrous condition, in a state of considerable purity, at a very much reduced cost.

It has been proposed to prepare calcium naphthenate by direct solution of calcium carbonate in naphthenic acids, but the results obtained in this manner are highly unsatisfactory and of no practical value whatever. The calcium naphthenate formed by this combination is viscous and gummy, even at a fairly elevated temperature; the pulverized solid forms balls coated with this gummy reaction product, and even the most vigorous stirring or agitation will not break these coatings to permit the powder within them to react with the acid. The result is that when molecular proportions are used, the final product contains a variable and never very large proportion of calcium naphthenate together with much unreacted calcium carbonate and free acid, and is useless for any purpose whatsoever. Other metallic oxids and hydroxids behave in a similar manner when brought into contact with the free acids and no mechanical manipulation of which I am aware will suffice to bring about complete combination between the acids and the metal of the oxid.

I have discovered that this difficulty may be avoided and a complete reaction brought about by the introduction into the reaction of a second liquid in which the acids are soluble, this liquid being added to the pulverized oxid or hydroxid in quantity sufficient to completely dampen it, prior to the addition of the free acids. This procedure may be illustrated by describing the manufacture of lead naphthenate by combining lead oxid with naphthenic acids.

First, the naphthenic acids separated from the gasoline and kerosene fractions of naphthenic crudes (or from heavier fractions if desired) are preferably purified by redistillation and/or other desired treatment and their combining weight is determined, as by titration with N/10 potassium hydroxid, using phenolphthalein as an indicator.

A suitable quantity of finely pulverized lead monoxid is then weighed out and placed in a stirring vessel provided with a heating means, preferably a steam pressure jacket. To this powder is added a suitable proportion of the above mentioned second liquid, the nature and the quantity of this liquid being governed by the use to which the lead naphthenate is to be put.

For example, if the naphthenate is to be used for desulfurizing crude petroleum or one of its fractions in a distillation step, the second liquid would by preference be a portion of the liquid to which the naphthenate is to be applied. If the naphthenate were destined to use as a constituent in a grease, the second liquid would preferably be a portion of one or more of the lubricating oils entering into the grease compound. In making lead naphthenate for use as a paint drier the second liquid might well be a purified petroleum distillate boiling between 300° and 400° Fahr., or a mixture of aromatic bodies of similar boiling points, or turpentine. The limitations are that the liquid should be oily in the sense of being nonaqueous and nonalcoholic; that it should readily wet the grains of the oxid used; that it should be beneficial or at least innocuous in the use to which the finished naphthenate is to be put; that it should be a solvent for the naphthenate product, and that it should be at least substantially nonreactive with the metallic oxid. Liquids having such properties are referred to generically in the claims as "neutral liquid". Suitably selected petroleums or their fractions or products meet all of these requirements in almost every case and will usually be the preferred materials.

The quantity of this dampening liquid should be sufficient to thoroughly dampen and coat every grain of the oxid, and the liquid should be mixed with the powder until this result is effected. As a rule the use of a larger quantity of the liquid is to be avoided except in cases where the reaction between the oxid and the acid is extremely energetic, in which case an excess of the inert liquid may be used to moderate the reaction velocity. An excess will obviously be undesirable in those cases where the dampening liquid is not a completely desirable constitutent of the finished product, as for example where it is desired to ship a concentrated lead naphthenate drier in the solid form, though in such cases it is feasible to use a dampening liquid of low boiling point, such as may be driven off along with the water of reaction, during the final heating step to be described.

To the dampened mass, which may vary in consistency from a moist powder to a thick slurry, the naphthenic acid is now added in a relatively thin stream and with constant intermixture, which should be continued until the acids are thoroughly distributed through and blended with the mass. As a rule this operation is best conducted at room temperature and the blend may then be allowed to stand for some time to allow at least the initial stages of the reaction to take place. In the case of lead oxid the reaction is so rapid that it will be practically completed prior to the application of any external heat, while other and less reactive oxids, such as those of zinc and iron, may react very slowly in the cold. In any case it is desirable to ensure the completion of the combination by raising the mass to a temperature ranging from 250° to 300° Fahr., and to maintain this temperature with constant stirring until the water of reaction is driven off.

A variable amount of frothing will take place during this heating and drying step, but the frothing is very much moderated by the presence of the dampening liquid. If the product is to be used in solution, as for desulfurizing oil or as a liquid drier, a carefully controlled addition of further quantities of a suitable liquid may be made during this step to restrain frothing or spattering. In the most difficult cases the water may be brought over by feeding to the mass under heat and agitation a thin stream of a petroleum distillate of such volatility as to be distilled out as fast as it is added, in which case the vapors should of course be condensed along with the evolved water.

It is possible in this manner to prepare anhydrous metallic naphthenates, free from by-product salts, either as a solution in a solvent compatible with the use to which the product is to be put or as a solid or viscous mass, from any metallic oxid which will react directly with the dry liquid naphthenic acids. For this purpose I may use, for example, lead monoxid, the oxid or hydroxid of zinc, calcium, barium, and magnesium, ferrous oxid or hydroxid, cuprous or cupric oxid or hydroxid, manganous oxid or hydroxid and manganese dioxid, as well as numerous other oxids and hydroxides of rarer metals of which the naphthenates would have little commerical utility.

In the attached claims reference is made to "an oygen compound" of a metal, by which I would be understood to mean a compound of the metal with oxygen either with or without hydrogen, i. e., either an oxid or an hydroxid.

I claim as my invention:

1. The method of producing a naphthenate of a metal which comprises: comminuting an oxide of said metal to powdered form; dampening the grains of said powder with a liquid having solvent power for the naphthenates produced and being an inert wetting agent for said oxide, and mixing said dampened powder with liquid naphthenic acid.

2. The method of producing a naphthenate of a metal which comprises: comminuting an oxide of said metal to powdered form; mixing with said powder a liquid having solvent power for the naphthenates produced and being an inert wetting agent for said oxide in quantity sufficient to at least dampen the grains thereof, and introducing liquid naphthenic acid to said mixture.

3. The method of producing a naphthenate of a metal which comprises comminuting an oxide of said metal to powdered form; mixing with said powder a liquid having solvent power for the naphthenates produced and being an inert wetting agent for said oxide in quantity sufficient to at least dampen the grains thereof; introducing liquid naphthenic acid to said mixture, and heating said mixture to a temperature sufficient to complete the reaction between said oxygen compound and said acid.

4. The method of producing a naphthenate of a metal which comprises: comminuting an oxide of said metal to powdered form; mixing with said powder a liquid having solvent power for the naphthenates produced and being an inert wetting agent for said oxide in quantity sufficient to at least dampen the grains thereof; introducing liquid naphthenic acid to said mixture; heating said mixture to a temperature not substantially less than 250° Fahr., and maintaining said temperature until the water of reaction is substantially driven off.

5. The method of producing a naphthenate of a metal which comprises: comminuting an oxide of said metal to powdered form; mixing with said powder a volatile liquid having solvent power for the naphtenates produced and being an inert wetting agent for said oxide in quantity sufficient to at least dampen the grains thereof; introducing liquid naphthenic acid to said mixture; heating said mixture to a temperature sufficient to cause vapors of water and of said volatile neutral liquid to be evolved, and maintaining said temperature and replacing said volatile neutral liquid in said mixture until the water of reaction is substantially driven off.

6. The method of producing lead naphthenate which comprises: dampening the grains of powdered lead monoxid with a petroleum product having solvent power for the naphthenates produced and being an inert wetting agent for said oxide; mixing with said dampened powder a liquid mixture of naphthenic acids, and thereafter heating said mixture to a temperature sufficient to drive off the water of reaction.

GERALD M. FISHER.